US012588600B2

(12) United States Patent
Wallon

(10) Patent No.: US 12,588,600 B2
(45) Date of Patent: Mar. 31, 2026

(54) ELECTRIC MOWER

(71) Applicant: KUBOTA CORPORATION, Osaka (JP)

(72) Inventor: Daniel Wallon, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 386 days.

(21) Appl. No.: 18/213,342

(22) Filed: Jun. 23, 2023

(65) Prior Publication Data

US 2024/0423134 A1 Dec. 26, 2024

(51) Int. Cl.
| | |
|---|---|
| *A01D 69/02* | (2006.01) |
| *A01D 34/00* | (2006.01) |
| *A01D 34/66* | (2006.01) |
| *A01D 34/76* | (2006.01) |
| *A01D 75/18* | (2006.01) |

(52) U.S. Cl.
CPC ........... *A01D 69/02* (2013.01); *A01D 34/006* (2013.01); *A01D 34/66* (2013.01); *A01D 34/76* (2013.01); *A01D 75/187* (2013.01)

(58) Field of Classification Search
CPC ...... A01D 34/006; A01D 34/66; A01D 34/76; A01D 69/02; A01D 75/187; H02K 9/08
See application file for complete search history.

(56) References Cited

U.S. PATENT DOCUMENTS

| | | | | |
|---|---|---|---|---|
| 2019/0124837 A1* | 5/2019 | Ito | .......................... | A01D 69/02 |
| 2022/0304226 A1* | 9/2022 | Yang | ...................... | A01D 34/78 |
| 2022/0408638 A1 | 12/2022 | Ito et al. | | |
| 2024/0066995 A1* | 2/2024 | Moturu | .................... | H02K 9/08 |
| 2025/0098576 A1* | 3/2025 | Wei | ........................ | A01D 34/78 |

* cited by examiner

*Primary Examiner* — Joseph M Rocca
*Assistant Examiner* — Robert E Pezzuto
(74) *Attorney, Agent, or Firm* — GREENBLUM & BERNSTEIN, P.L.C.

(57) ABSTRACT

An electric mower includes: a body; a battery on the body; at least one motor drivable on electric power from the battery; a mower unit drivable on motive power from the at least one motor; a support member disposed below the battery and held by the body, and at least one controller supported by the support member and configured to control the at least one motor, the body including an engagement section, the support member including a hook section, the support member being attachable to and detachable from the body with the hook section engaged with the engagement section.

14 Claims, 6 Drawing Sheets

ELECTRIC MOWER

FIELD OF THE INVENTION

The present invention relates to an electric mower including a mower unit drivable by a motor.

BACKGROUND OF THE INVENTION

An electric mower includes wheels and a mower unit. The wheels are drivable on electric power from a battery for the electric mower to travel. The mower unit is also drivable on electric power from the battery to cut grass. As disclosed in US2022408638A1, an electric mower includes a battery at a back portion of its body.

There has been a demand for a battery with a large capacity for improvement of the efficiency in the mowing operation. This has in turn led to a need to place a large-sized battery on the body efficiently and mount the battery on the body accurately, that is, a need to efficiently and accurately mount components such as a battery on the body.

The present invention has an object of providing an electric mower including components mounted on its body efficiently and accurately.

SUMMARY OF THE INVENTION

To attain the above object, an electric mower as an embodiment of the present invention includes: a body; a battery on the body; at least one motor drivable on electric power from the battery; a mower unit drivable on motive power from the at least one motor; a support member disposed below the battery and held by the body, and at least one controller supported by the support member and configured to control the at least one motor, the body including an engagement section, the support member including a hook section, the support member being attachable to and detachable from the body with the hook section engaged with the engagement section.

With the above configuration, the support member is detachably held by the body. This allows the at least one controller to be held by the body efficiently. Further, the support member is held by the body with the hook section engaged with the engagement section. This allows the support member to be assembled easily and accurately.

The electric mower may further include: a bracket lateral to the battery, wherein the engagement section is at the bracket, and the support member is held by the body with use of the bracket.

The electric mower may further include: a wheel; a body frame supported by the wheel on ground; and a plate unit supported by the body frame and supporting the battery from below, wherein the bracket is supported by the plate unit.

The electric mower may be configured such that the plate unit includes: a first plate supported by the body; a second plate forward of the at least one first plate; a third plate backward of the at least one first plate; and a fourth plate supported by the first plate and supporting the second plate and the third plate, wherein the bracket extends from the second plate to the third plate over the first plate.

The electric mower may be configured such that the support member includes an opening through which a lower face of the at least one controller is exposed downward.

The electric mower may be configured such that the mower unit includes: at least one mower blade; and a mower cover covering the at least one mower blade from above, wherein the at least one controller does not coincide with the mower cover as viewed in an up-down direction.

The electric mower may be configured such that the at least one mower blade includes a plurality of mower blades, the at least one motor includes a plurality of motors, the at least one controller includes a plurality of controllers, the mower blades, the motors, and the controllers form a plurality of combinations, and the controllers are arranged in a direction of a width of the electric mower.

The electric mower may further include: a drive wheel; and a drive wheel motor configured to drive the drive wheel, wherein the at least one controller is forward of the drive wheel motor.

BRIEF DESCRIPTION OF THE DRAWINGS

The present disclosure is further described in the detail description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE INVENTION

Figure 1:
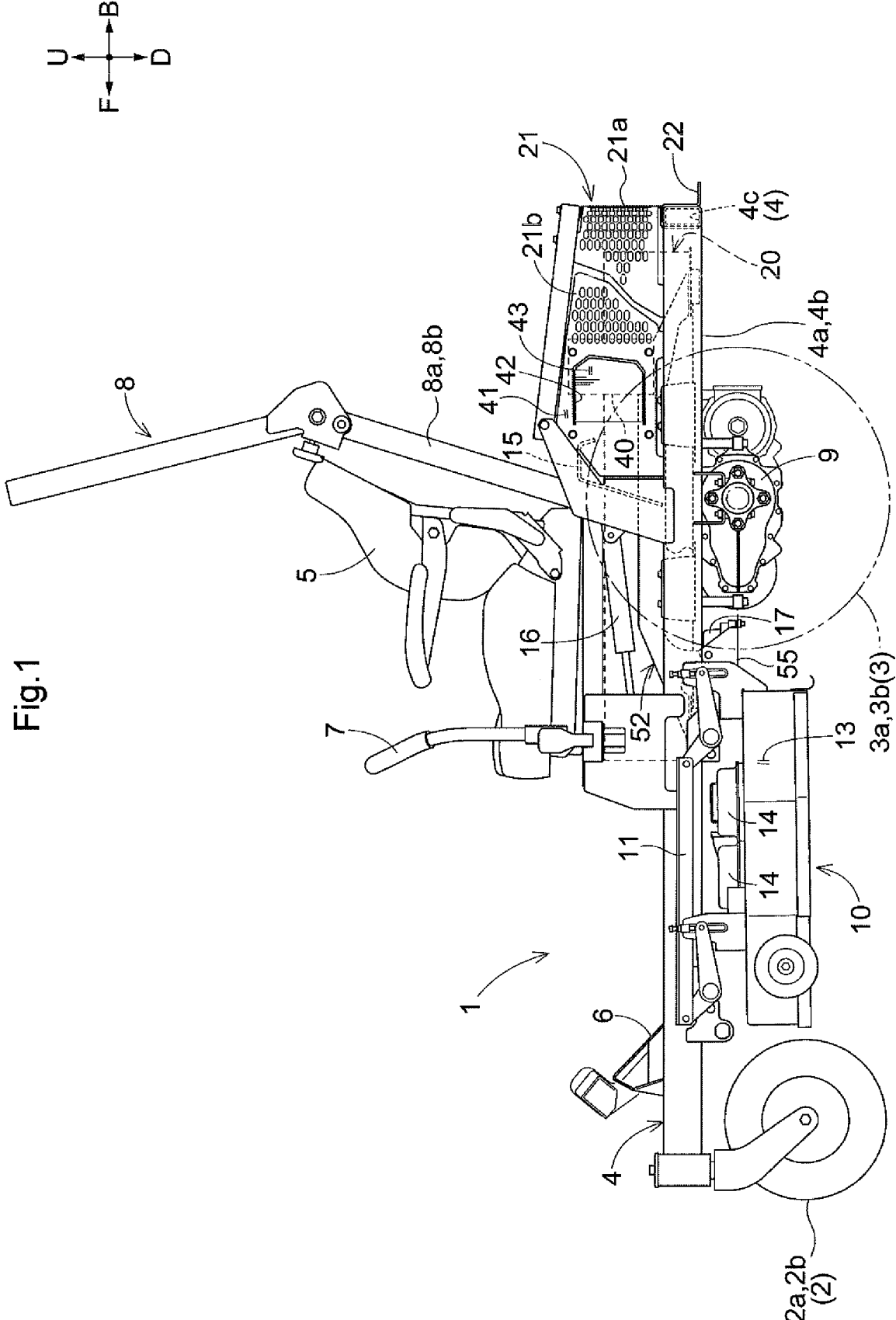
FIG. 1 is a side view of an electric mower.

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

Overall Configuration of Electric Mower

Figure 2:
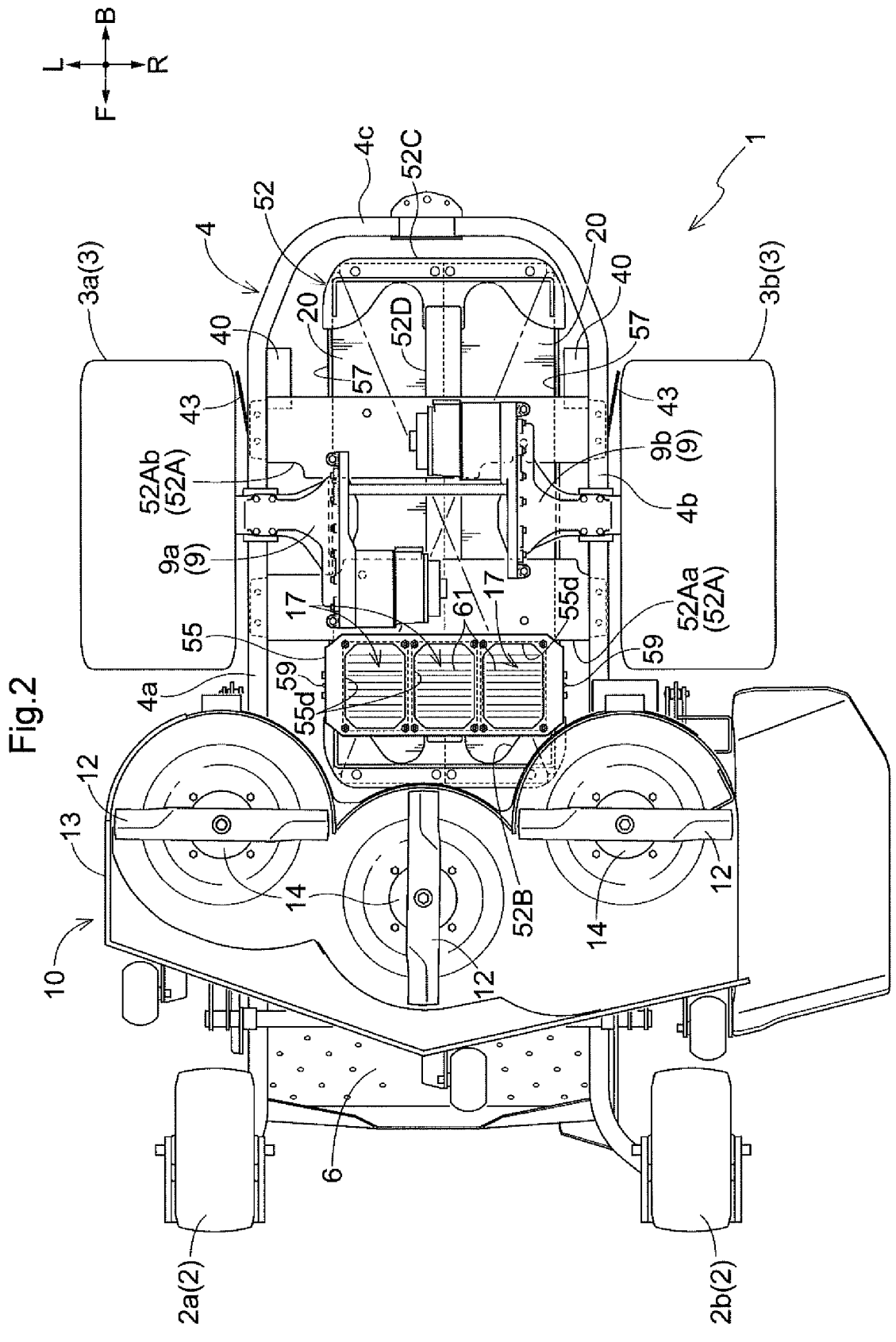
FIG. 2 is a bottom view of an electric mower.

The description below deals with an electric mower as an embodiment. As illustrated in FIGS. 1 and 2, the electric mower is of a riding type, and includes a body 1 provided with front wheels 2, drive wheels 3, and a body frame 4. The front wheels 2 are namely a left front wheel 2a and a right front wheel 2b each in the form of a rotatable caster. The drive wheels 3 are namely a left rear wheel 3a and a right rear wheel 3b. The body frame 4 is supported by the front wheels 2 and the drive wheels 3 on the ground. The body frame 4 includes a left frame section 4a, a right frame section 4b, and a back end section 4c coupling a back end portion of the left frame section 4a to a back end portion of the right frame section 4b.

The body 1 is provided with a driver's seat 5 on which an operator is able to sit. The body 1 is provided with a floor plate 6 in front of the driver's seat 5 on which floor plate 6 the operator is able to place their feet. The body 1 is provided with left and right control levers 7 to the left and right of the driver's seat 5. As illustrated in FIG. 2, the body 1 is provided with two drive wheel motors 9 configured to drive the respective drive wheels 3, namely, a motor 9a configured to drive the left rear wheel 3a and a motor 9b configured to drive the right rear wheel 3b. The operator is able to operate the control levers 7 to change the respective rotation speeds of the left rear wheel 3a and the right rear wheel 3b.

Figure 3:
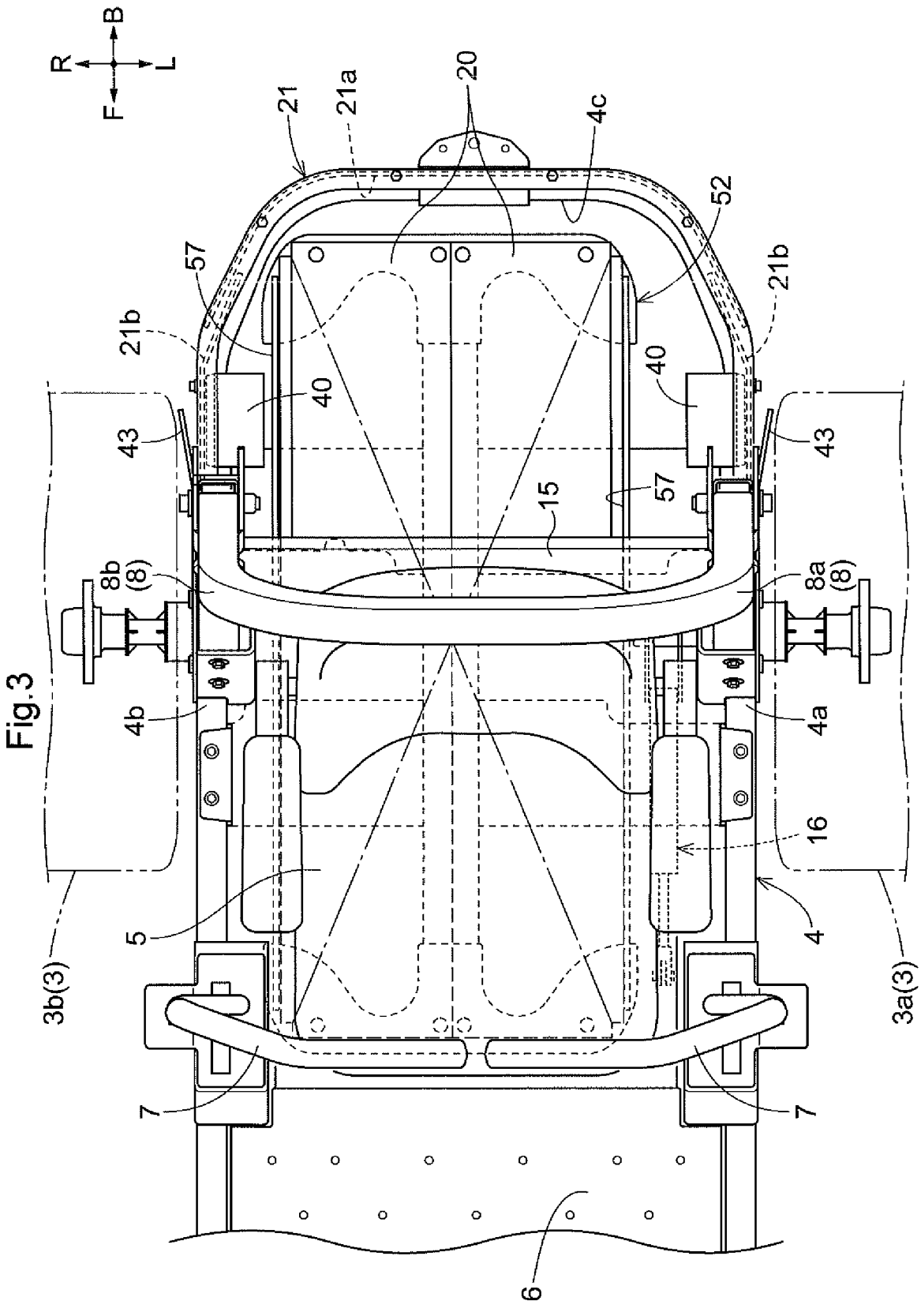
FIG. 3 is a plan view of a back portion of an electric mower.

As illustrated in FIGS. 1 and 3, the electric mower includes a rollover protection structure (ROPS) 8 disposed backward of the driver's seat 5 and fixed to the body frame 4. The ROPS 8 includes a left vertical section 8a fixed to the left frame section 4a, a right vertical section 8b fixed to the right frame section 4b, and a cross member 15 coupling a lower portion of the right vertical section 8b to a lower portion of the left vertical section 8a.

As illustrated in FIGS. 1 and 3, the electric mower includes a battery 20 in a space extending from respective back end portions of the left frame section 4a and the right frame section 4b to below the driver's seat 5. As illustrated in FIG. 3, the electric mower includes a cover 21 covering at least a portion of the battery 20. The cover 21 includes a back wall 21a backward of the battery 20 and a left side wall 21b and a right side wall 21b each extending forward from the back wall 21a. The battery 20 is between the left frame section 4a and the right frame section 4b in a plan view.

The battery 20 is disposed toward a first side (for the present embodiment, the right side) in the left-right direction of the electric mower between the left frame section 4a and the right frame section 4b. The electric mower includes a holder device 16 disposed between the battery 20 and the body frame 4 on a second side (for the present embodiment, the left side) in the left-right direction and configured to temporarily hold a mower unit 10 at its lifted position.

How Battery is Supported

As illustrated in FIGS. 2 to 5, the electric mower includes a plate unit 52 supporting the battery 20 from below. The plate unit 52 includes a first plate 52A, a second plate 52B, a third plate 52C, a fourth plate 52D, and two brackets 57.

The first plate 52A includes a front first plate section 52Aa and a back first plate section 52Ab. The first plate 52A (which includes a front first plate section 52Aa and a back first plate section 52Ab) has a right end portion supported by the right frame section 4b and a left end portion supported by the left frame section 4a, so that the first plate 52A is supported by the body frame 4. The first plate 52A is, for example, bolted to the body frame 4.

The fourth plate 52D is fixed to and supported by the first plate 52A. The fourth plate 52D is, for example, welded to the upper face of the first plate 52A. The fourth plate 52D extends in the front-back direction over the front first plate section 52Aa and the back first plate section 52Ab to protrude forward from the front first plate section 52Aa and backward from the back first plate section 52Ab.

Figure 4:
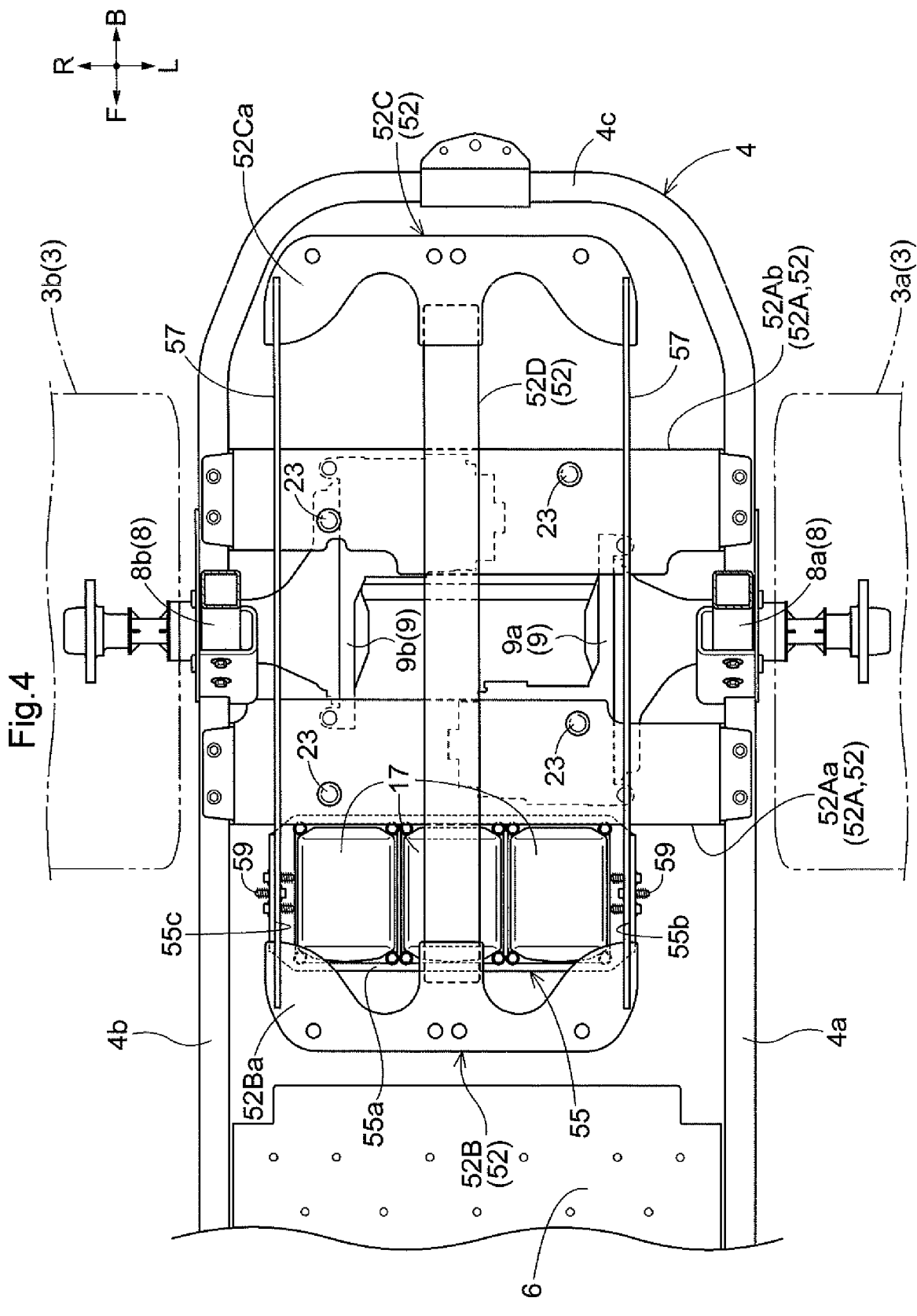
FIG. 4 is a view of elements supporting a battery from below.

The second plate 52B is fixed to and supported by a front end portion of the fourth plate 52D. The second plate 52B is, for example, welded to the upper face of the front end portion of the fourth plate 52D. The second plate 52B extends to the left and right of the fourth plate 52D. The drawings such as FIG. 4 illustrate an example in which the second plate 52B is supported only by the fourth plate 52D and is not in contact with the body frame 4. The second plate 52B may alternatively be supported by the body frame 4.

The third plate 52C is fixed to and supported by a back end portion of the fourth plate 52D. The third plate 52C is, for example, welded to the upper face of the back end portion of the fourth plate 52D. The third plate 52C extends to the left and right of the fourth plate 52D. The drawings such as FIG. 4 illustrate an example in which the third plate 52C is supported only by the fourth plate 52D and is not in contact with the body frame 4. The third plate 52C may alternatively be supported by the body frame 4.

The brackets 57 are supported by the upper face of the plate unit 52 at respective opposite lateral end portions of the plate unit 52. Specifically, the brackets 57 include a left bracket 57 and a right bracket 57. The left bracket 57 extends from a left end portion of the second plate 52B to a left end portion of the third plate 52C, and is supported by the first plate 52A, the second plate 52B, and the third plate 52C. The right bracket 57 similarly extends from a right end portion of the second plate 52B to a right end portion of the third plate 52C, and is supported by the first plate 52A, the second plate 52B, and the third plate 52C.

The battery 20 is supported by the second plate 52B and the third plate 52C. The battery 20 is, for example, bolted to the respective upper faces of the second plate 52B and the third plate 52C. The brackets 57 hold the battery 20 laterally, so that the battery 20 has a left side portion and a right side portion held by the left and right brackets 57, respectively.

With the above configuration, the second plate 52B and the third plate 52C respectively hold the front and back portions of the battery 20 firmly, so that the plate unit 52 supports the battery 20 efficiently and accurately. Further, the brackets 57 hold and position the battery 20, which allows the battery 20 to be easily bolted to the respective upper faces of the second plate 52B and the third plate 52C.

The plate unit 52 is supported by the body frame 4 (namely, the left frame section 4a and the right frame section 4b) at the first plate 52A, so that the plate unit 52 is supported by the body frame 4 with a simple configuration. With the first plate 52A bolted to the body frame 4, the second plate 52B, the third plate 52C, and the fourth plate 52D are not supported by the body frame 4. This allows the plate unit 52 to be easily attached to and detached from the body frame 4.

Configuration of Mower Unit

The electric mower includes a mower unit 10 between the front wheels 2 and the drive wheels 3 and below the body 1. The mower unit 10 is suspended from the body 1 with use of a lifting and lowering link mechanism 11 in such a manner as to be capable of being lifted and lowered. The mower unit 10 is below the battery 20.

As illustrated in FIG. 2, the mower unit 10 includes three mower blades 12 and a mower cover 13 covering the mower blades 12 from above. The mower unit 10 includes three motors 14 provided for the respective mower blades 12 and drivable on electric power from the battery 20. The mower unit 10 is drivable by the motors 14.

The mower unit 10 includes three controllers 17 configured to control the respective motors 14. The controllers 17 for the present embodiment are each an inverter configured to convert electric current from the battery 20 into a three-phase alternating current with a predetermined frequency and supply the alternating current to the corresponding motor 14, which is thereby driven in accordance with the frequency. The battery 20, the controllers 17, and the motors 14 are connected to one another with use of a harness or the like (not illustrated in the drawings).

The mower unit 10 includes two or more (for the present embodiment, three) combinations of mower blades 12, motors 14, and controllers 17. The controllers 17 are arranged in the direction of the width of the electric mower, and are fixed to the body 1 with use of a support member 55.

How Controllers are Supported

Figure 5:
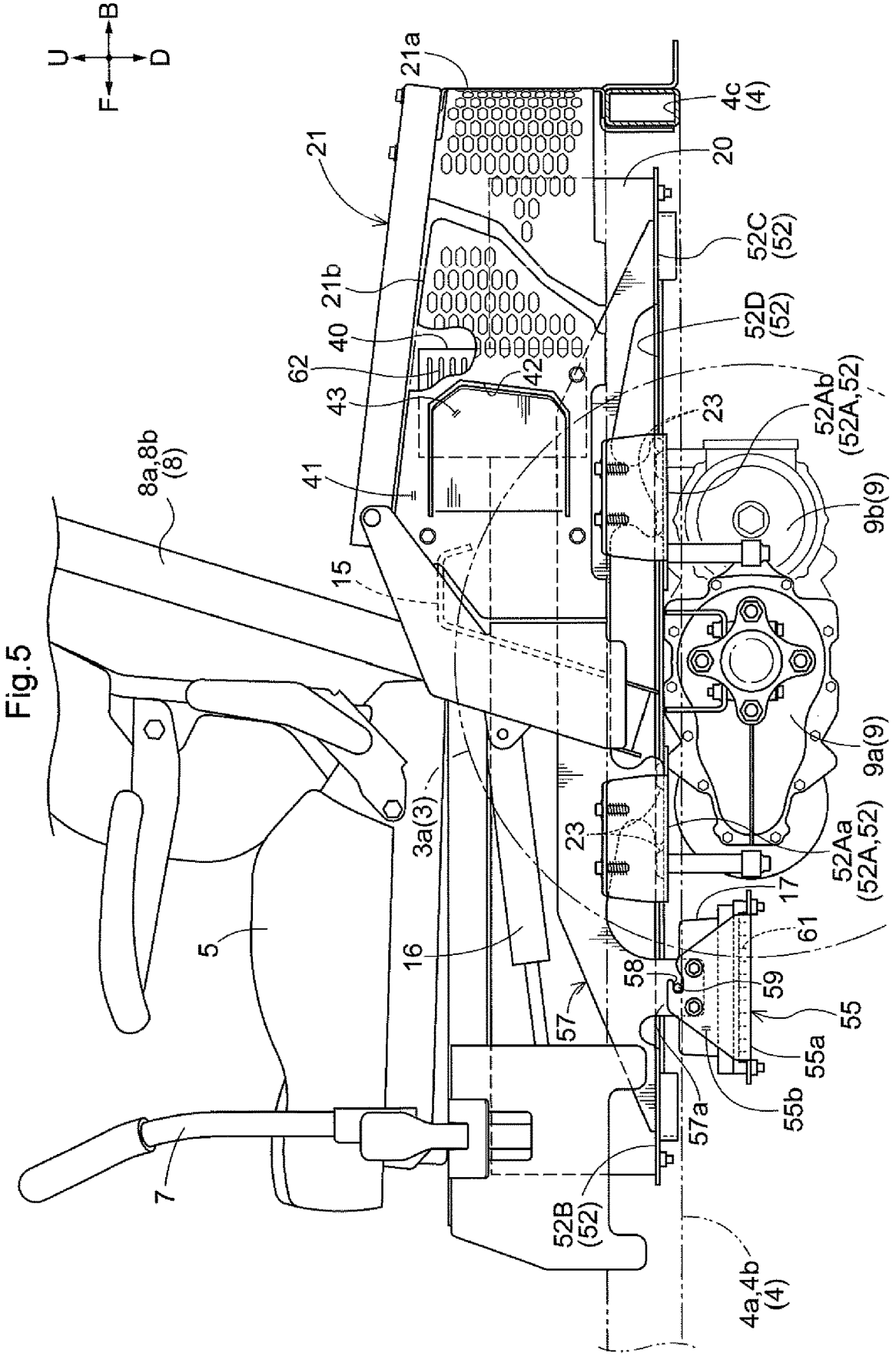
FIG. 5 is a side view of elements supporting a battery and a controller for a work motor and of a cover.
Figure 6:
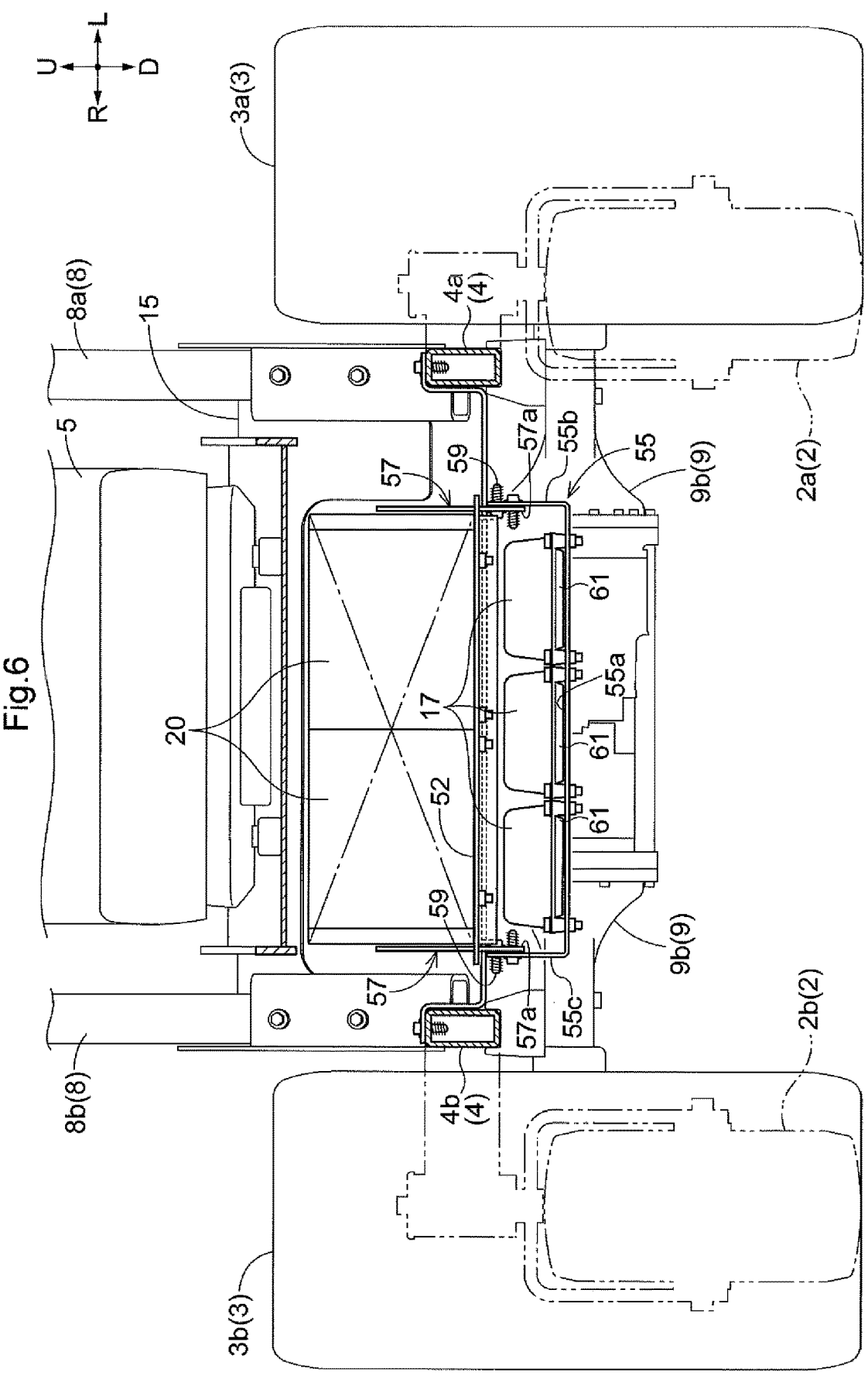
FIG. 6 is a front view of elements supporting controllers for work motors.

As illustrated in FIGS. 4 to 6, the support member 55 is disposed below the battery 20 and fixed to the body 1. The support member 55 includes a support section 55a, a left wall 55b, and a right wall 55c. The support section 55a supports the controllers 17. The support member 55 includes no front wall or back wall, and is open on the front side and the back side. The support member 55 (as well as the controllers 17) is, for example, in a space surrounded by the front wheels 2, the drive wheel motors 9, and the battery 20.

The left wall 55b and the right wall 55c each include a hook section 58 in the form of a notch in the upper end.

The brackets 57 each include a downward protrusion 57a between the second plate 52B and the front first plate section 52Aa in a side view. The brackets 57 are each provided with an engagement section 59 in the form of a pin protruding laterally from the corresponding protrusion 57a.

The support member 55 is suspended from the brackets 57 with each hook section 58 engaged with the corresponding engagement section 59 to be held by the body 1. The support member 55 is fixed to and held by the brackets 57 as, for example, the left wall 55b and the right wall 55c are each bolted to the corresponding protrusion 57a with each hook section 58 engaged with the corresponding engagement section 59.

The above configuration allows the support member 55 to be fixed to the body 1 (specifically, the brackets 57) in such a manner as to be laterally detachable from the body 1 easily. Engaging each hook section 58 with the corresponding engagement section 59 temporarily fixes the support member 55 to the brackets 57 before bolting the support member 55 to the brackets 57. This allows the support member 55 to be held by the brackets 57 accurately and attached to and detached from the brackets 57 easily.

As illustrated in FIG. 2, the support section 55a has three openings 55d through which the respective lower faces of the controllers 17 are exposed downward. In a case where the controllers 17 each include a heat sink section 61 for discharging heat at a lower face thereof, exposing the heat sink section 61 downward through the corresponding opening 31 cools the controller 17 efficiently. The controllers 17 are forward of the drive wheel motors 9, which are configured to drive the respective drive wheels 3, and do not coincide with the mower cover 13 as viewed in the up-down direction.

Configurations of Motors for Driving Drive Wheels and Controller

As illustrated in FIG. 2, the drive wheel motors 9, namely the motors 9a and 9b, are disposed below the battery 20 and fixed to the plate 52. The drive wheel motors 9 are each drivable on electric power from the battery 20.

The electric mower includes two controllers 40 configured to control the respective motors 9a and 9b. In other words, the drive wheels 3 (namely, the left rear wheel 3a and the right rear wheel 3b), the drive wheel motors 9 (namely, the motor 9a and the motor 9b), and the controllers 40 form two combinations. The controllers 40 for the present embodiment are each an inverter configured to convert electric current from the battery 20 into a three-phase alternating current with a predetermined frequency and supply the alternating current to the corresponding one of the motors 9a and 9b, which is thereby driven in accordance with the frequency. The battery 20, the controllers 40, and the drive wheel motors 9 are connected to one another with use of a harness or the like (not illustrated in the drawings).

As illustrated in FIG. 3, the controllers 40 are between the side walls 21b of the cover 21 and on respective opposite sides in the direction of the width of the electric mower. The controllers 40 are each between the battery 20 and the corresponding one of the side walls 21b. The controllers 40 are each backward of a lower end portion of the ROPS 8.

As illustrated in FIG. 5, the side walls 21b are each a plate member 41 positioned in correspondence with the corresponding one of the controllers 40. The plate member 41 has an opening 42 for use in cooling the controller 40, and includes a dust preventer plate 43 configured to prevent suction of dust through the opening 42. The opening 42 has (i) a front end forward of the front end of the controller 40 and (ii) a back end backward of the front end of the controller 40.

Forming the opening 42 and the dust preventer plate 43 involves cutting a slit at a central portion of the plate member 41 in the shape of a substantial U turned by 90 degrees toward the front side and bending the slit portion at the straight line connecting the upper ends of the U. The opening 42 and the dust preventer plate 43 are thus integral with the plate member 41. The dust preventer plate 43 is connected to the front end of the opening 42 and so inclined that a portion farther backward is farther apart from the opening 42 (see FIG. 2).

In a case where the controllers 40 each include a heat sink section 62 for discharging heat, the heat sink section 62 faces the opening 42 and is exposed through the opening 42. This cools the controller 40 efficiently. The holder device 16, which is configured to temporarily hold the mower unit 10 at its lifted position, is forward of that one of the plurality of (for the present embodiment, two) controllers 40 which is on the left.

The description below deals with example alternatives to the embodiment described above.

Alternative Embodiments (1) The embodiment described above under "Detailed Description of the Invention" is not necessarily configured such that the first plate 52A includes two plate sections, namely a front first plate section 52Aa and a back first plate section 52Ab. The first plate 52A may alternatively include a single plate section or three or more plate sections. The first plate 52A is configured according to the configuration and/or size of the battery 20, so that the plate unit 52 supports the battery 20 efficiently and accurately regardless of the configuration or size of the battery 20.

(2) The embodiment described above under "Detailed Description of the Invention" is not necessarily configured such that the battery 20 is supported by the second plate 52B and the third plate 52C. The battery 20 may alternatively be supported by not only the second plate 52B and the third plate 52C but also at least either the first plate 52A or the fourth plate 52D. The battery 20 may further alternatively be supported by at least one of the first plate 52A, the second plate 52B, the third plate 52C, and the fourth plate 52D. This indicates a larger degree of freedom in how the battery 20 is supported.

(3) The embodiment described above under "Detailed Description of the Invention" is not necessarily configured such that the fourth plate 52D extends in the front-back direction from the second plate 52B to the third plate 52C. The fourth plate 52D may be configured in any manner as long as the fourth plate 52D is supported by the first plate 52A and supports the second plate 52B and the third plate 52C.

(4) The embodiment described above under "Detailed Description of the Invention" is not necessarily configured such that the first plate 52A is supported by the left frame section 4a and the right frame section 4b. The first plate 52A may be supported by the body 1 in any manner.

(5) The embodiment described above under "Detailed Description of the Invention" may be configured such that the second plate 52B includes, at each of opposite lateral end portions thereof, a first support 52Ba protruding backward to support the battery 20 and that the third plate 52C includes, at each of opposite lateral end portions thereof, a second support 52Ca protruding forward to support the battery 20. The plate unit 52, with the first supports 52Ba and the second supports 52Ca, has a larger area for supporting the battery 20, and thereby supports the battery 20 more accurately.

(6) The embodiment described above under "Detailed Description of the Invention" is not necessarily configured such that the first plate 52A, the second plate 52B, the third plate 52C, and the fourth plate 52D are separate members connected to one another. The four plates may be integral with one another.

(7) The embodiment described above under "Detailed Description of the Invention" is configured such that the first plate 52A is at a position below the battery 20. The first plate 52A may be configured such that the front first plate section 52Aa is forward of the position at which the ROPS 8 is coupled to the body frame 4 and that the back first plate section 52Ab is backward of that position.

(8) The embodiment described above under "Detailed Description of the Invention" may be configured such that the plate unit 52 supports the battery 20 with elastic members 23 in-between. The elastic members 23 are made of rubber, for example, and allow the battery 20 to be supported by the plate unit 52 more accurately. The elastic members 23 are on the respective upper faces of the second plate 52B and the third plate 52C, and may additionally be on the upper face of at least either the first plate 52A or the fourth plate 52D.

(9) The embodiment described above under "Detailed Description of the Invention" is an example in which the ROPS 8 includes a cross member 15. The present invention is, however, not limited to such a configuration, and may be configured such that the ROPS 8 does not include a cross member 15.

(10) The embodiment described above under "Detailed Description of the Invention" is not necessarily configured such that the brackets 57 are supported by the first plate 52A, the second plate 52B, and the third plate 52C. The brackets 57 may be supported by any portion of the plate unit 52. Further, the brackets 57 are not necessarily supported by the plate unit 52, and may alternatively be supported by any portion of the body 1 such as the body frame 4. The brackets 57 may alternatively be absent, so that the engagement sections 59 are each at a portion of the body 1 such as the body frame 4.

(11) The embodiment described above under "Detailed Description of the Invention" may be configured such that the support member 55 has no openings 55d.

(12) The embodiment described above under "Detailed Description of the Invention" is not necessarily configured such that the controllers 17 (or the support member 55) are in the above-described positional relationship with the mower cover 13 and the drive wheel motors 9. The controllers 17 may be in any positional relationship with the mower cover 13 and the drive wheel motors 9.

(13) The embodiment described above under "Detailed Description of the Invention" is not necessarily configured such that the controllers 17 are supported by the support member 55 as arranged laterally (that is, along the width of the electric mower). The controllers 17 may be arranged in any manner.

(14) The embodiment described above under "Detailed Description of the Invention" is an example including a ROPS 8. The present invention is, however, not limited to such a configuration, and may omit the ROPS 8.

(15) The embodiment described above under "Detailed Description of the Invention" is an example including a holder device 16. The present invention is, however, not limited to such a configuration, and may omit the holder device 16.

(16) The embodiment described above under "Detailed Description of the Invention" is an example including a dust preventer plate 43 at the opening 42. The present invention is, however, not limited to such a configuration, and may omit the dust preventer plate 43.

(17) The embodiment described above under "Detailed Description of the Invention" is an example in which the dust preventer plate 43 is so inclined that a portion farther backward is farther apart from the opening 42. The present invention is, however, not limited to such a configuration, and may be configured such that the dust preventer plate 43 is, for instance, parallel to the opening 42.

(18) The embodiment described above under "Detailed Description of the Invention" is an example in which the controllers 40 are each backward of a lower end portion of the ROPS 8 and in which the opening 42 has (i) a front end forward of the front end of the controller 40 and (ii) a back end backward of the front end of the controller 40. The present invention is, however, not limited to such a configuration, and may be configured, for instance, such that the controllers 40 are each forward of a lower end portion of the ROPS 8 and that the opening 42 has a front end backward of the back end of the controller 40.

(19) The embodiment described above under "Detailed Description of the Invention" is an example including three combinations of mower blades 12, motors 14, and controllers 17. The present invention is, however, not limited to such a configuration, and may include fewer or more combinations of the above.

(20) The embodiment described above under "Detailed Description of the Invention" is an example in which the controllers 17 and the controllers 40 are each an inverter. The present invention is, however, not limited to such a configuration, and may be configured such that the controllers 17 and the controllers 40 are each another electric current converter.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

REFERENCE SIGNS LIST

1 Body
2 Front wheel
3 Drive wheel
4 Body frame
10 Mower unit
12 Mower blade
13 Mower cover
14 Motor
17 Controller
20 Battery
52 Plate unit
52A First plate
52B Second plate
52C Third plate
52D Fourth plate
55 Support member
57 Bracket
58 Hook section
59 Engagement section

The invention claimed is:

1. An electric mower, comprising:
a body;
a battery on the body;
at least one motor drivable on electric power from the battery;
a mower unit drivable on motive power from the at least one motor;
a support member disposed below the battery and held by the body, and
at least one controller supported by the support member and configured to control the at least one motor,
the body including an engagement section,
the support member including a hook section including an open notch into which the engagement section can slide into in a back-to-front lateral direction, the hook section extending above the engagement section, and
the support member being attachable to and detachable from the body with the hook section engaged with the engagement section.

2. The electric mower according to claim 1, further comprising:
a bracket lateral to the battery, wherein
the engagement section is at the bracket, and
the support member is held by the body with use of the bracket.

3. The electric mower according to claim 2, further comprising:
a wheel;
a body frame supported by the wheel on ground; and
a plate unit supported by the body frame and supporting the battery from below,
wherein the bracket is supported by the plate unit.

4. The electric mower according to claim 3, wherein the plate unit includes:
a first plate supported by the body;
a second plate forward of the first plate;
a third plate backward of the first plate; and
a fourth plate supported by the first plate and supporting the second plate and the third plate,
wherein the bracket extends from the second plate to the third plate over the first plate.

5. The electric mower according to claim 1, wherein the support member includes an opening through which a lower face of the at least one controller is exposed downward.

6. The electric mower according to claim 1, wherein the at least one mower blade includes a plurality of mower blades,
the at least one motor includes a plurality of motors,
the at least one controller includes a plurality of controllers,
the mower blades, the motors, and the controllers form a plurality of combinations, and
the controllers are arranged in a direction of a width of the electric mower.

7. The electric mower according to claim 1, further comprising:
a drive wheel; and
a drive wheel motor configured to drive the drive wheel,
wherein the at least one controller is forward of the drive wheel motor.

8. An electric mower, comprising:
a body;
a battery on the body;
at least one motor drivable on electric power from the battery;
a mower unit drivable on motive power from the at least one motor, the mower unit including at least one mower blade, and a mower cover covering the at least one mower blade from above;
a support member disposed below the battery and held by the body, and
at least one controller supported by the support member and configured to control the at least one motor,
the body including an engagement section,
the support member including a hook section including an open notch into which the engagement section can slide into in a back-to-front lateral direction, the hook section extending above the engagement section,
the support member being attachable to and detachable from the body with the hook section engaged with the engagement section; and
wherein the at least one controller does not coincide with the mower cover as viewed in an up-down direction.

9. The electric mower according to claim 8, further comprising:
a bracket lateral to the battery, wherein
the engagement section is at the bracket, and
the support member is held by the body with use of the bracket.

10. The electric mower according to claim 9, further comprising:
a wheel;
a body frame supported by the wheel on ground; and
a plate unit supported by the body frame and supporting the battery from below,
wherein the bracket is supported by the plate unit.

11. The electric mower according to claim 10, wherein the plate unit includes:
a first plate supported by the body;
a second plate forward of the first plate;
a third plate backward of the first plate; and
a fourth plate supported by the first plate and supporting the second plate and the third plate,
wherein the bracket extends from the second plate to the third plate over the first plate.

11
12

12. The electric mower according to claim 8, wherein
the support member includes an opening through which a
lower face of the at least one controller is exposed
downward.

13. The electric mower according to claim 8, wherein
the at least one mower blade includes a plurality of mower
blades, the at least one motor includes a plurality of motors, the at least one controller includes a plurality of control-
lers, the mower blades, the motors, and the controllers form a
plurality of combinations, and the controllers are arranged in a direction of a width of the
electric mower.

14. The electric mower according to claim 8, further
comprising:

a drive wheel; and a drive wheel motor configured to drive the drive wheel, wherein the at least one controller is forward of the drive
wheel motor.

* * * * *